US006638439B2

(12) United States Patent
Shimomura

(10) Patent No.: US 6,638,439 B2
(45) Date of Patent: Oct. 28, 2003

(54) INK-JET RECORDING HEAD AND ITS MANUFACTURING METHOD

(75) Inventor: Akihiko Shimomura, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 09/737,590

(22) Filed: Dec. 18, 2000

(65) Prior Publication Data

US 2001/0010304 A1 Aug. 2, 2001

(30) Foreign Application Priority Data

Dec. 20, 1999 (JP) .......................................... 11-360412

(51) Int. Cl.[7] .............................. B41J 2/04; G11B 5/27; G01D 15/00

(52) U.S. Cl. ............................. 216/27; 216/41; 216/47; 216/62; 347/45

(58) Field of Search ............................. 216/27, 62, 41, 216/47; 347/45

(56) References Cited

U.S. PATENT DOCUMENTS 4,657,631 A 4/1987 Noguchi ..................... 156/655
5,030,317 A 7/1991 Noguchi ..................... 156/630
5,436,650 A 7/1995 Kobayashi et al. ........... 347/63
5,478,606 A 12/1995 Ohkuma et al. ............ 427/555
5,758,417 A 6/1998 Kobayashi et al. ........ 29/809.1
5,763,141 A 6/1998 Shimomura et al. ........ 430/320
6,123,863 A 9/2000 Shimomura et al. .......... 216/27
6,155,673 A 12/2000 Nakajima et al. ............. 347/61
6,409,931 B1 * 6/2002 Shimomura et al. ........ 205/127

FOREIGN PATENT DOCUMENTS

JP 5124199 A * 5/1993 ............ B41J/2/135
JP 6-286149 10/1994

* cited by examiner

*Primary Examiner*—Robert Kunemund
*Assistant Examiner*—Shamim Ahmed
(74) *Attorney, Agent, or Firm*—Fitzpatrick, Cella, Harper & Scinto

(57) ABSTRACT

When liquid for recording such as ink is accumulated around ejection ports deviations in ejecting (flying) directions of ink droplets ejected from ejection ports in an ink-jet recording head are observed so that recording results of high quality can not be attained any more. In order to prevent such deviations water-repellent treatments have been employed. The present invention provides a means with a simple ink-jet recording head manufacturing procedure enable to provide an ink-jet recording head at a low cost. In order to provide such ink-jet recording head the following method is proposed. A manufacturing method of an ink-jet recording head characterized by forming ejection ports and water-repellent treated areas simultaneously by one patterning procedure comprising steps of, forming a resin layer for ejection ports out of an energy active ray curing material, curing portions of the resin layer to be hydrophilic except ejection ports irradiating the energy active ray, applying a water-repellent photosensitive resin curable by the energy active ray on the cured resin layer and irradiating energy active ray for curing portions of the applied water-repellent photosensitive resin layer corresponding to the ejection ports and the inner and the resin layer for the ejection ports.

5 Claims, 2 Drawing Sheets

INK-JET RECORDING HEAD AND ITS MANUFACTURING METHOD

BACKGROUND OF THE INVENTION

1. Field of the Invention

The present invention relates to an ink-jet recording head where recording liquid usually called "ink" is ejected in the form of tiny liquid droplets from fine ejection ports, and is flown into the atmosphere and deposited on a medium to be recorded, and also relates to its manufacturing method.

2. Brief Description of the Related Art

An ink-jet recording head employed in the above-mentioned ink-jet recording method, has usually fine ejection ports (orifices), ink flow paths and energy generating modules for ejecting liquid arranged on portions of the ink flow paths. Manufacturing procedures described, for example, in the U.S. Pat. Nos. 4,657,631 and 5,030,317 etc. have been known as manufacturing methods of the above-mentioned conventional ink-jet recording heads In order to obtain images of high quality by employing these ink-jet recording heads, it is desirable to keep the volume and ejecting velocity of ejected recording liquid droplets as uniform as possible.

For attaining such high quality the U.S. Pat. No. 6,155,673, for example, discloses ink-jet recording heads where driving signals in response to information to be recorded are applied to ink ejecting pressure generating elements (electro-thermal conversion modules), for generating enough thermal energy to raise the ink temperature over a nucleus boiling point so as to form bubbles, which drive ink droplets flying into the atmosphere.

In the above-mentioned ink-jet recording heads, the shorter is a distance between the electro-thermal conversion module and the orifice (hereinafter referred as "OH distance") the more preferable it is. Since the OH distance virtually determines the ejected volume, it is necessary to set the OH distance precisely with good reproducibility.

The above-mentioned manufacturing method of the ink-jet recording head with the short OH distance and high accuracy is disclosed for example, in the U.S. Pat. No. 5,478,606. Hereinafter the outline of the manufacturing method is explained.

The manufacturing method in the above-mentioned laid open patent is characterized by the following steps comprising a step to form an ink-flow pattern out of a soluble resin on a base plate, a step to form a coated resin layer, which forms walls of ink-flow on the above-mentioned soluble resin layer coated with a resin solution including a solid epoxy resin at the ordinary temperature, a step to form ejection ports on the resin coated layer over the above-mentioned ejecting pressure generating elements and a step to dissolve the soluble resin layer.

The finished recording head is obtained after a water-repellent agent coated on a flexible material such as silicon rubber etc. is transferred to a surface of the ink-jet recording head where ejection ports are formed in the above-mentioned way, dried and cured.

Ejecting (flying) directions of ink droplets ejected from ejection ports in the ink-jet recording head manufactured by the above-mentioned method deviate when liquid for recording such as ink is accumulated around the ejection ports so that recording results of high quality can no longer be attained any more. As measures against such deviations, a method of water-repellent treatment on a surface where ejection ports are formed, to prevent the liquid accumulation that cause the deviations of the ejecting directions, around ejection ports has been known.

Even if the above-mentioned water-repellent treatment is carried out, sometimes ink accumulated around the ejection ports moves toward the ejection ports and clogs the ejection ports. Measures to prevent a large amount of ink from moving toward the ejection ports is attained by forming ink deposition areas where a hydrophilic treatment is carried out at portions spaced slightly apart from the ejection ports (hereinafter referred as "partial hydrophilic treatment").

As the above-mentioned partial hydrophilic treatment, the hydrophilic treatment zones are formed by fusing and evaporating a coated resin layer formed out of dissolved florine resin with an abrasion treatment by employing an exima laser etc. However the method requires an expensive apparatus and a complicated procedure so that the manufacturing cost for such ink-jet head becomes more expensive.

SUMMARY OF THE INVENTION

The objective of the present invention is to provide a partially hydrophilic treatment on an ink-jet recording head bearing enough toughness against outside factors such as a recording sheet jam and abrasion caused by paper dust, carried out by a simple procedure at a low cost.

In order to attain the objective, the present invention provides either one of the methods or the ink-jet recording head according to the following ways (1) to (5).

(1) A manufacturing method of an ink-jet recording head including ejection ports constituted by a resin layer and a water-repellent photosensitive resin layer, both resins are curable by irradiating with an energy active ray, comprising steps of:

- preparing a substrate having ink ejecting energy generating portions, forming the resin layer on the substrate,
- curing the resin layer except portions for the ejection ports and the periphery of the ejection ports by irradiating with the energy active ray,
- forming the water-repellent photosensitive resin layer on the cured resin layer,
- curing the water-repellent photosensitive resin layer and non irradiated portions of the resin layer except portions for the ejection ports simultaneously by irradiating with the energy active ray,
- forming the ejection ports by developing the resin layer anal the water-repellent photosensitive resin layer.

(2) A manufacturing method of the ink-jet recording head according to (1) wherein energy generating portions are made of electro-thermal energy conversion modules which generate thermal energy.

(3) A manufacturing method of the ink-jet recording method according to (1) wherein the ink-jet head is a full-line type ink-jet recording head where a plurality of the ejection ports are formed to cover a whole width of a recording medium.

(4) A manufacturing method of the ink-jet recording head according to (1) wherein ejection ports for multicolor recording are formed in one piece.

(5) An ink-jet recording head manufactured by either one of the methods of (1) to (4), An ink-jet recording head with no temporal interruptions of ink ejection, with stable recording images of high quality, and with virtually no deviations in ink ejecting directions is obtained at a low cost, when the above-mentioned surface treating method according to the present invention is employed.

DETAILED DESCRIPTION OF THE PREFERRED EMBODIMENT'S

Hereinafter embodiments according to the present invention are described in detail by referring drawings.

The manufacturing method of the ink-jet recording head disclosed in the above-mentioned Japanese laid open No. 6-286149 is applied to the embodiments of the present invention. FIG. 1A to FIG. 1G illustrate each step of the manufacturing procedure of the ink-jet recording head in the embodiments according to the present invention.

Embodiment 1

Figure 1A:
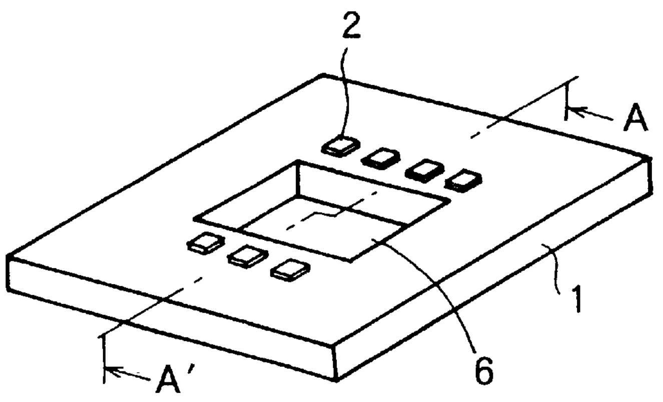
FIG. 1A to FIG. 1G show a surface treatment procedure around ejection ports of an ink-jet recording head in an embodiment according to the present invention.

A blast mask is fitted on a silicon substrate 1 where a plurality of electro-thermal energy conversion modules 2 (heaters made of $HfB_2$) are arranged as shown in FIG. 1A and a through hole 6 (an opening for ink supply) for ink supply is formed by sand blasting.

Figure 1B:
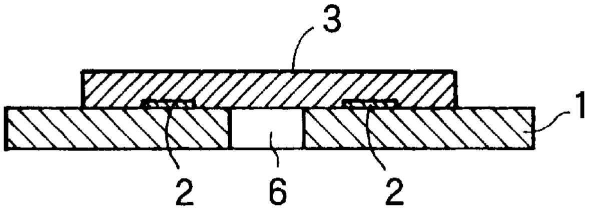

Polymethyl-isopropenylketone (produced by Tokyo Ohka Kogyo Kabushiki Kaisha under a trade name of ODUR-1010), which is applied to a PET (polyethylene terephthalate) film and dried to obtain a laminated dry film, is transferred to the substrate 1 by removing the PET film so that a soluble resin layer 3 is formed as shown in FIG. 1B. Since the above-mentioned ODUR-1010 originally can not form a thick film due to a low viscosity, it is used after concentrated.

A patterning exposure on the transferred soluble resin layer is executed by a mask aligner produced by Canon Kabushiki Kaisha (cold mirror CM290) to form an ink path after the transferred resin layer is pre-baked at 120° C. for 20 minutes. After exposing for 1.5 minutes the soluble resin layer is developed by spraying 1% sodium hydroxide solution. The pattern formed out of the soluble resin layer 3 is to reserve an ink path which connects to the opening 6 for ink supply and to the electro-thermal energy conversion modules 2. The thickness of a resist (the soluble resin layer 3) after the development is 10 μm.

Figure 1C:
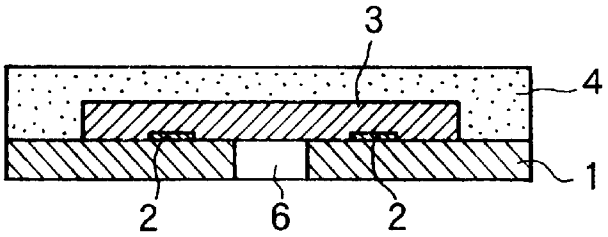

A solution including compounds described below dissolved in a solvent, a mixture of methyl isobutylketone and diglyme (diethylene glycol simethylether) is applied by a spin coating to the patterned substrate to form a photosensitive resin layer 4 as shown in FIG. 1C. A thickness of the formed resin layer on the pattern is 10, μm.

(Composition of the photosensitive resin layer 4)

Epoxy resin, EHPE-3150 (trade name produced by Daicel Chemical Co.) Diol, 1,4-HFAB (trade name produced by Central Glass Kabushiki Kaisha) Silane coupling agent, A-187 (trade name produced by Nihon Unicr Co.) Initiator for photo-polymerization, Adeca optmer SP-170 (trade name produced by Asahi Denka Kogyo Kabushiki Kaisha)

Figure 1D:
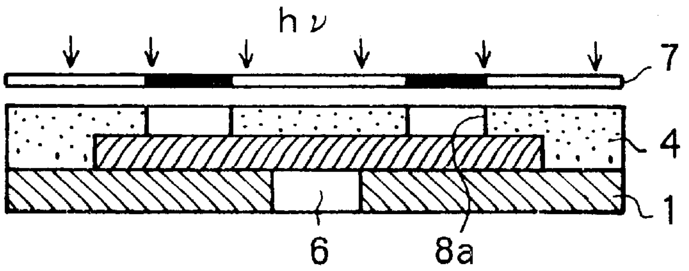

A patterning exposure on the photosensitive resin layer 4 is executed by the above-mentioned PLA520 (CM250) via mask 7 so as to form hydrophilic portions. Portions depicted by stippled portions of the photosensitive resin layer 4 in FIG. 1D are exposed for 10 seconds and then after-baked at 60° C. for 30 minutes. Base openings 8*a* for ejection ports are formed by this exposure.

Figure 1E:
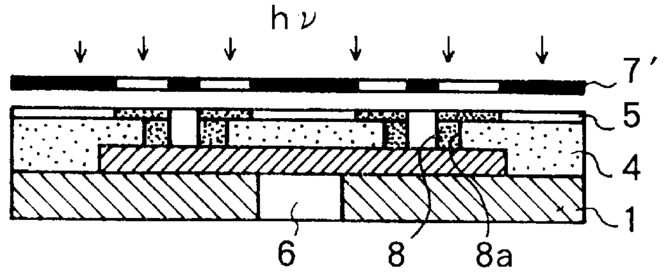

The substrate is coated with a water-repellent photosensitive resin layer 5 by spraying diglyme solution including compounds described below. Another pattern exposure on the water-repellent photosensitive resin layer 5 is executed by the above-mentioned PLA520 (CM250) via mask T. Portions depicted by densely stippled portions of the water-repellent photosensitive resin layer 5 and additional portions (i.e. area densely stippled) of the photosensitive resin layer 4 in FIG. 1E are exposed so as to obtain ejection ports 8 with completely water-repellent treated surrounding areas.

(Composition of the photosensitive primer 5)

Epoxy resin, EHPE-3150 (trade name produced by Daicel Chemical Co.) Cheminox AFEp (trade name produced by Nihon Mechtron Kabushiki Kaisha) Diol, 1,4-HFAB (trade name produced by Central Glass Kabushiki Kaisha) MF-120 (trade name produced by Kabushiki Kaisha Tohchem) Silane coupling agent, A-187 (trade name produced by Nihon Unicr Co.) Initiator for photo-polymerization, Adeca optmer SP-170 (trade name produced by Asahi Denka Kogyo Kabushiki Kaisha)

Figure 1F:
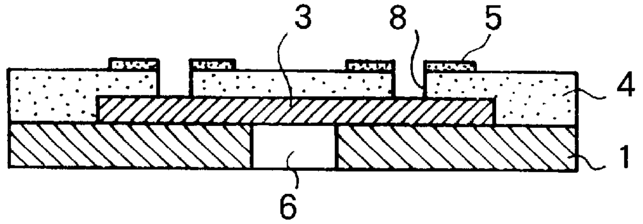

As shown FIG. 1F the exposed water-repellent photosensitive resin layer 5 is developed by methyl iso-buthyl ketone so as to form ejection ports 8, the above-mentioned surrounding water-repellent areas and remaining hydrophilic areas. In this embodiment, the water-repellent area pattern around the base openings 8*a* for the ejection ports with diameter 26 μm are formed.

At this stage the soluble resin layer 3 is still remained on the substrate 1. After exposing the substrate again by the above-mentioned PLA520 (CM290) for 2 minutes so as to decompose main chains of the soluble resin layer 3, the substrate is immersed in methyl lactate and is applied ultrasonic wave for solving remained soluble resin layer 3 so as to form the liquid path pattern as shown in FIG. 1G.

The substrate is heated at 150° C. for one hour so as to cure the photosensitive coating layer 4 and the water-repellent photosensitive resin layer completely.

Figure 1G:
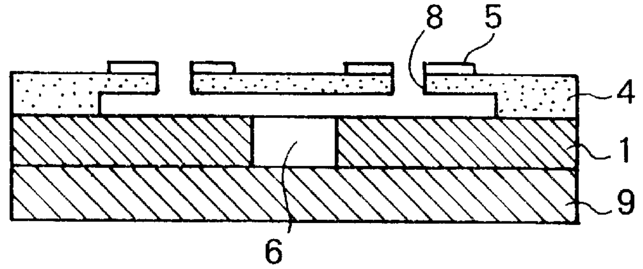
Figure 1H:
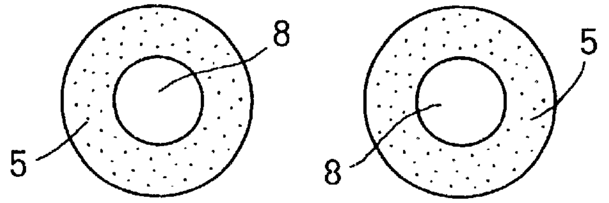
FIG. 1H illustrates an enlarged surrounding area of ejection ports viewed from the ejection port side.

The finished ink-jet recording head according to the present invention is obtained by adhering an ink supplying member 9 over the opening 6 for ink supply as shown in FIG. 1G. FIG. 1H illustrates the enlarged surrounding area of ejection ports 8 viewed from the ejection port side.

The ink-jet recording head obtained by procedures mentioned above attains stable images with high quality without temporal interruptions of ejecting ink, since no ink sticks around ejection ports 8, and since ink sticking to hydrophilic areas is prevented from moving toward ejection ports due to surrounding areas coated with the water-repellent photosensitive resin layer 5, and as a result no bad effects on ink ejection are observed.

Embodiment 2

In this embodiment an ink-jet head is manufactured in the same way as the embodiment 1, except for the coating step' of the water-repellent photosensitive resin layer. Namely, in this embodiment, a diglyme solution of the water-repellent photosensitive resin is applied to a PET film, and dried to obtain a laminated dry film, and the resin layer on the dry film is transferred to the substrate.

The same effects as the embodiment 1 are also confirmed when the printing tests are executed by employing the ink-jet recording head manufactured according to this embodiment.

As explained above, images with high quality without temporal interruption of ejecting ink are steadily attained according to the present invention where the surface treating process on the ink-jet recording head is included. And the ink-jet recording head with virtually no deviations in ink ejecting direction is obtained at a low cost.

What is claimed is:

1. A manufacturing method of an ink-jet recording head including ejection ports formed by using a resin layer and a water-repellent photosensitive resin layer, wherein both resins are curable by irradiating with an energy active ray, comprising steps of:

preparing a substrate having ink ejecting energy generating portions, forming said resin layer on the substrate, curing said resin layer, except portions disposed at said ejection ports and at the periphery of said ejection ports, by irradiating with said energy active ray, forming said water-repellent photosensitive resin layer on said cured resin layer, curing said water-repellent photosensitive resin layer and nonirradiated portions of said resin layer, except for portions disposed at said ejection ports, simultaneously by irradiating with said energy active ray, forming said ejection ports by developing said resin layer and said water-repellent photosensitive resin layer.

2. A manufacturing method of said ink-jet recoding head according to claim 1 wherein energy generating portions for ink ejection are made of electro-thermal energy conversion modules which generate thermal energy.

3. A manufacturing method of said ink-jet recording head according to claim 1 wherein said ink-jet head is a full-line ink-jet recording head where a plurality of said ejection ports are formed to cover a whole width of recording medium.

4. A manufacturing method of said ink-jet recording head according to claim 1 wherein ejection ports for multi-color recording are formed in one piece.

5. A manufacturing method of an ink-jet recording head including ejection ports by using a resin layer and a water-repellent photosensitive resin layer, wherein both resins are curable by irradiating with an energy active ray, comprising steps of:

preparing a substrate having ink ejecting energy generating portions, forming said resin layer on the substrate, curing said resin layer, except portions disposed at said ejection ports and at the periphery of said ejection ports, by irradiating with said energy active ray, forming said water-repellent photosensitive resin layer on said cured resin layer, curing the periphery of said ejection ports of said water-repellent photosensitive resin layer and the periphery of said ejection ports of said resin layer simultaneously by irradiating with said energy active ray, forming said ejection ports by developing said resin layer and said water-repellent photosensitive resin layer.

* * * * *

UNITED STATES PATENT AND TRADEMARK OFFICE

CERTIFICATE OF CORRECTION

PATENT NO. : 6,638,439 B2
DATED : October 28, 2003
INVENTOR(S) : Akihiko Shimomura It is certified that error appears in the above-identified patent and that said Letters Patent is hereby corrected as shown below:

Title page,
Item [57], ABSTRACT,
Line 8, "enable" should be deleted.

Column 1,
Line 21, "heads" should read -- heads. --.

Column 2,
Line 48, "anal" should read -- and --; and
Line 62, "An" should read -- wherein an --.

Column 3,
Line 8, "EMBODIMENT'S" should read -- EMBODIMENTS --;
Line 23, "for ink" should be deleted;
Line 24, "supply" should be deleted; and
Line 51, "10, μm." should read -- 10 μm. --.

Column 4,
Line 19, "shown" should read -- shown in --;
Line 20, "iso-buthyl" should read -- iso-butyl --;
Line 26, "is still remained" should read -- still remains --; and
Line 51, "step'" should read -- step --.

Column 5,
Line 17, "ray," should read -- ray, and --.

UNITED STATES PATENT AND TRADEMARK OFFICE
CERTIFICATE OF CORRECTION

PATENT NO. : 6,638,439 B2
DATED : October 28, 2003
INVENTOR(S) : Akihiko Shimomura It is certified that error appears in the above-identified patent and that said Letters Patent is hereby corrected as shown below:

Column 6,
Line 23, "ray," should read -- ray, and --.

Signed and Sealed this

Thirtieth Day of March, 2004

JON W. DUDAS
*Acting Director of the United States Patent and Trademark Office*